United States Patent
Audren

[11] Patent Number: 5,898,497
[45] Date of Patent: Apr. 27, 1999

[54] MULTIMODE OPTICAL FIBER GYRO WITH A DOUBLE PHASE CONJUGATE MIRROR

[75] Inventor: Jean-Thierry Audren, St. Remy Les Chevreuse, France

[73] Assignee: SFIM Industries, Massy, France

[21] Appl. No.: 08/953,086

[22] Filed: Oct. 17, 1997

[30] Foreign Application Priority Data

Oct. 21, 1996 [FR] France .................................. 96 12738

[51] Int. Cl.$^6$ .................................................. G01C 19/72
[52] U.S. Cl. .................................................. 356/350
[58] Field of Search ........................... 356/350; 382/94

[56] References Cited

U.S. PATENT DOCUMENTS

| | | |
|---|---|---|
| 4,571,080 | 2/1986 | Papuchon et al. . |
| 4,575,245 | 3/1986 | Bordé . |
| 4,659,223 | 4/1987 | Huignard et al. .................. 356/350 |
| 4,765,740 | 8/1988 | Fischer .................................. 356/350 |
| 4,944,591 | 7/1990 | McMichael ............................ 356/350 |
| 5,181,078 | 1/1993 | Lefevre et al. . |

FOREIGN PATENT DOCUMENTS

| | | |
|---|---|---|
| 0 079 268 A1 | 5/1983 | European Pat. Off. . |
| 0 455 530 A1 | 11/1991 | European Pat. Off. . |
| 2 503 862 | 10/1982 | France . |

Primary Examiner—Samuel A. Turner
Attorney, Agent, or Firm—McCormick, Paulding & Huber

[57] ABSTRACT

A gyro of the type having a multimode optical fiber loop in which light propagates in both directions before being recombined, together with a device constituting a phase conjugate "mirror", wherein the device is a double phase conjugate "mirror" and is disposed in the loop so that the light reaches said device from both sides thereof, with the incident light at each side of the device serving as a pumping wave for phase conjugation of the incident wave arriving at the other side of the device.

11 Claims, 1 Drawing Sheet

MULTIMODE OPTICAL FIBER GYRO WITH A DOUBLE PHASE CONJUGATE MIRROR

The present invention relates to optical fiber gyros.

BACKGROUND OF THE INVENTION

Optical fiber gyros are now conventional practice.

In general, as shown diagrammatically in FIG. 1, they comprise a laser emitter module 1 and a detector module 2 connected via a coupler 7 and a Y junction 8 to a looped optical fiber 3, together with modulator means 4 disposed at the input/output ends of the loop, in the vicinity of the point—referenced A in FIG.1—where the ends of the loop 3 come together, said means 4 being controlled by a processor unit 5 to which the output signals from the module 2 are sent.

Such gyros make use of the Sagnac effect which occurs in the loop when the loop is subjected to rotation about its axis.

The wave rotating in the same direction of rotation as that imposed on the loop is subjected to a phase shift $\phi_1$ of:

$$\phi_1 = KL - 2\pi RL\Omega/\lambda C$$

where:
K=wave number=$2\pi/\lambda$
R=radius of the coil
L=optical path length in the fiber
$\Omega$=angular velocity
$\lambda$=wavelength
C=speed of light
while the wave rotating in the opposite direction is subjected to a phase shift $\phi_2$ of:

$$\phi_2 = KL + 2\pi RL\Omega/\lambda C$$

The detector module 2 and the processor unit 5 make it possible, in theory, to measure the phase difference:

$$\phi_2 - \phi_1 = 4\pi RL\Omega/\lambda C$$

from the output signal, which output signal corresponds to interference between the two waves when they return to point A after travelling along the full length of the coil.

Unfortunately, in reality, the term KL is much greater than $2\pi RL\Omega/\lambda C$, and the ratio between them can be as great as $10^{15}$.

It will be understood that as a result the proper operation of optical fiber gyros requires the optical paths to present perfect reciprocity in both directions, i.e. the term KL in the equation for $\phi_1$ must be exactly the same as the term KL in the equation for $\phi_2$.

As a result, optical gyros normally operate only with monomode fibers that conserve polarization. With multimode fibers, the results obtained with a structure of the kind shown in FIG. 1 are disturbed by mixing and interference between the various modes, with each mode corresponding to a different value of L.

Unfortunately, polarization-conserving monomode fibers are much more expensive to manufacture than are multimode fibers.

The invention thus seeks to propose a multimode fiber gyro in which the various modes are recombined correctly, without their various waves interfering with one another.

Proposals have already been made to solve this problem of making multimode fiber gyros with phase conjugation.

It is recalled that phase-conjugating materials (wrongly called phase-conjugate "mirrors") are non-linear materials, e.g. photorefractive crystals, in which interference between an incident wave and a pumping wave creates refractive index gratings. The conjugate wave obtained at the outlet from such a crystal is the result of the pumping wave diffracting on said index gratings.

Unfortunately, the time required to build index gratings is very long compared with the time taken by light to pass through said gratings in photorefractive materials, such that any rapid variation in the parameters of the incident wave is absent from the conjugate wave, even though rapid variations in the parameters of the pumping wave are indeed to be found in the conjugate wave.

That is why the phase-conjugate gyros that have been proposed in the past have long response times.

For example, it can be shown that with phase-conjugate gyro structures of the kinds proposed in:

[1] FR 2 503 862—"Dispositif optique interférométrique avec miroir(s) gyro conjugaison de phase, en particulier gyromètre laser" [Interferometer optical device with phase-conjugate mirror(s), in particular a laser gyro], C. Bordé, CNRS; and

[2] Applied Optics, Vol. 25, No. 7, Apr. 1, 1986, "Phase conjugate optic gyro", a phase shift of $\Delta\phi$ in the gyro loop that is established for a length of time that is shorter than the response time of the phase-conjugating crystal gives rise, in said phase shift, whether reciprocal or otherwise, to a phase difference of $\Delta\phi$ or of $-\Delta\phi$ on the detected outlet signal, whereas for a phase shift established for a duration greater than the response time of the crystal, the phase difference in the detected output signal is $2\Delta\phi$.

Similarly, with self-pumped phase-conjugate mirror gyro structures, such as those proposed in:

[3] EP 79268 —Michelson type interferometer with a photorefractive mirror.

[4] Optics Letters, Vol. 11, No. 10, Oct. 1986, "Self-pumped phase-conjugate fiber optic gyro",

[5] Optics Letters, Vol. 12, No. 12, Dec. 1987, "Phase-conjugate multimode fiber gyro", C*W. H. Chen, P. J. Wang;

[6] SPIE, Vol. 838, Fiber optic and laser sensors, 1987, "Phase-conjugate fiber optic gyro with multimode fibers"; and

[7] Yasuo Tamita, IEEE Journal of quantum electronics, Vol. 25, No. 3, Mar. 1989, "Polarization and spatial recovery by modal dispersal and phase conjugation: properties and applications", a $\Delta\phi$ phase shift in the gyro loop established during a length of time that is shorter than the response time of the phase-conjugating crystal gives rise, depending on whether said phase shift is reciprocal or not, to a phase difference of $2\Delta\phi$ or of 0 in the output signal as detected, whereas for a phase shift that is established for a length of time greater than the response time of the crystal, the phase difference in the detected signal is $2\Delta\phi$.

Consequently, prior art gyros and phase-conjugate gyros are incapable of operating with signals at a frequency greater than the frequency which corresponds to the response time of the phase-conjugating crystal.

In particular, such large response times prevent such phase-conjugate gyros being used with phase shift type modulation such as that implemented by the processor unit 5 and the modulator means 4 of the structure of FIG. 1, since such phase shift keying requires fast response times.

Unfortunately, processing by means of phase shift, which makes it possible to ignore the high degree of power non-linearity in the detectors as a function of phase, turns out to be essential for proper operation of present gyros.

OBJECT AND BRIEF SUMMARY OF THE INVENTION

The present invention proposes a gyro having a multimode fiber and phase conjugation, but which avoids those drawbacks.

The solution of the invention consists in using a "mirror"-forming device that performs phase conjugation twice, the device being disposed in the loop in such a manner that light reaches it through both sides, and with phase conjugation being performed at each side of the device and being pumped by the wave reaching it from the side opposite from that from which the conjugate wave leaves.

BRIEF DESCRIPTION OF THE DRAWING

Other characteristics and advantages of the invention appear further from the following description. This description is purely illustrative and non-limiting. It should be read with reference to the accompanying drawing, in which.

MORE DETAILED DESCRIPTION

Figure 1:
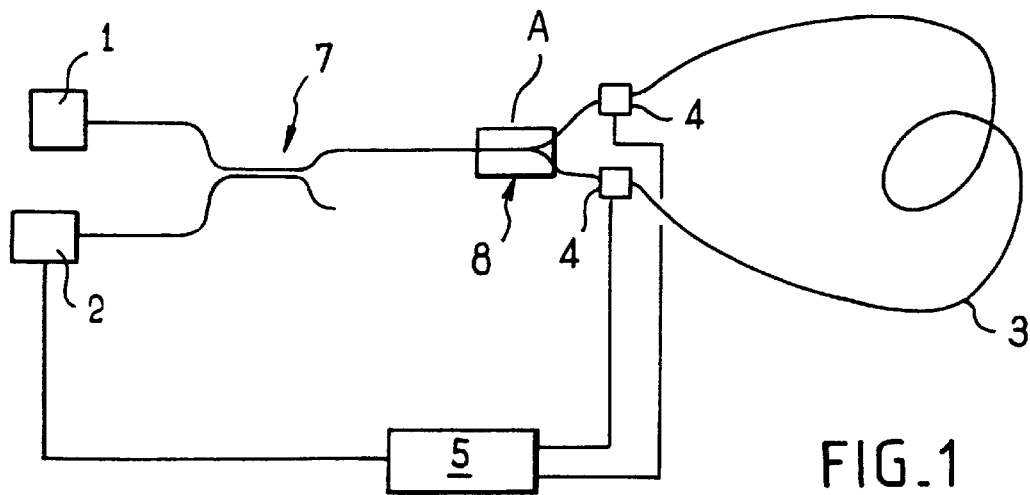
FIG. 1, as described above, is a diagram of a prior art optical fiber gyro.
Figure 2:
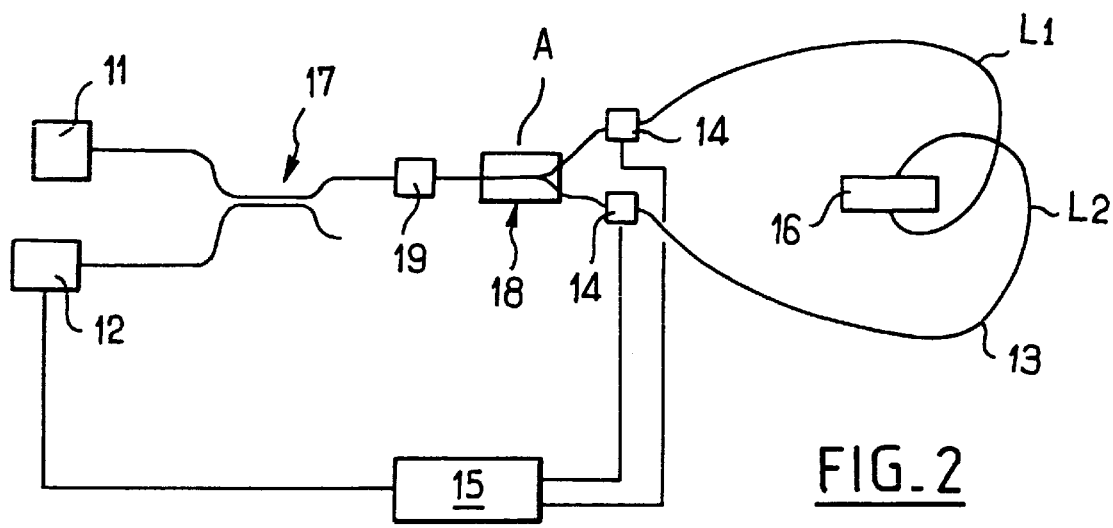
FIG. 2 is a diagram of a gyro constituting a possible embodiment of the invention.

The optical fiber gyro shown in FIG. 2, like the gyro of FIG. 1, comprises an emitter unit 11 and a detector unit 12 connected via a coupler 17 and a Y junction 18 to an optical loop 13 which has modulator means 14.

It also includes a processor unit 15 which controls the modulator means 14 and to which the signals output by the module 12 are sent.

The optical loop 13 is a loop of multimode fiber in which there is integrated a device 16 that constitutes a double phase conjugate "mirror". For a general description of double phase conjugate mirrors, reference may advantageously be made to:

[8] CRONIN GOLOMB, Applied physics letters, 47, 1131, 1985; and

[9] WEISS STERNKLAR FISHER, Optics letters, Vol. 12, No. 2, p. 114–115, 1987. The two branches of the loop 13 on either side of the mirror 16 are referenced L1 and L2.

At both sides of said "mirror" 16, the phase conjugation is pumped by the wave reaching it from the side opposite to the side from which the conjugate wave leaves.

Figure 3:
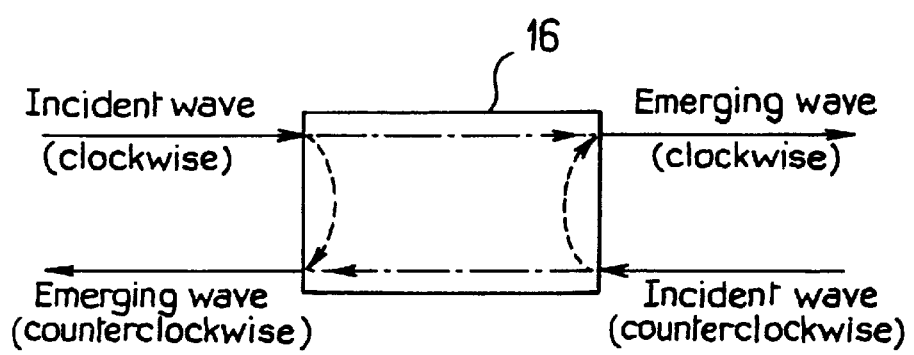
FIG. 3 is a diagram showing a detail of FIG. 2.

This is shown in FIG. 3, where dashed lines represent phase conjugation phenomena while chain-dotted represent diffraction phenomena.

The operation of this structure can be understood in two different ways depending on whether the phase variations in the waves incident on the "mirror" 16 are fast or slow relative to the response time of said "mirror".

When phase shifting is fast, the gyro can be considered as being a conventional gyro in the sense that the light beam reaching the device 16 via branch L1 (or L2 as the case may be) passes through said device 16 while being diffracted therein, and then propagates along the other branch L2 (or L1 as the case may be) prior to being recombined at point A where the branches L1 and L2 join together.

In other words, any fast phase shifting of the pumping waves is to be found on the waves which reach point A after propagating in both directions round the loop 13.

Thus, a reciprocal shift $\Delta\phi$ in the loop 13 gives rise to zero phase difference on the signal that is recombined at point A, whereas a non-reciprocal phase shift $\Delta\phi$ gives rise to a phase difference of $2\Delta\phi$ on the recombined signal.

For slow phase shifting, the device 16 can be thought of as acting as a phase-conjugate "mirror".

Light reaching the crystal 16 via the branch L1 is "reflected" back into said branch after being subjected to phase conjugation, and it returns via the same branch L1 prior to being recombined at point A with light that has travelled in the other branch L2 and that has been similarly "reflected".

Naturally, reciprocal phase shifting in the loop 13 gives rise for each of the branches L1 and L2 to zero phase difference on the go-and-return signal reaching point A for recombination.

Non-reciprocal phase shifting $\Delta\phi$ in the loop 13 gives rise to a phase difference of $2\Delta\phi$ in the recombined signal.

Thus, the gyro has the same sensitivity to phase shifting regardless of whether it is fast or slow. In both cases, in the recombined wave, the phase difference due to the Sagnac effect is: $4\pi R(L_{1+L2})\Omega/\lambda.C$ Consequently, a gyro is provided using a multimode fiber and phase conjugation, and which presents uniform sensitivity at its inputs.

One of the consequences thereof is that it is possible with such a multimode fiber structure to perform modulation on the signals input to the loop 13, with this being done by the means 14 and the unit 15. The modulation and the treatment performed on the recombined signal may, for example, be of the types described in EP0359666 or EP0455530, to which reference may advantageously be made.

The phase conjugate "mirror" 16 is advantageously constituted by a photorefractive crystal, thereby making it possible to operate at low power levels for the pump waves, e.g. a crystal of bismuth and silicon oxide (BSO or $Bi_{12}SiO_{20}$) or of barium titanate ($TiO_3Ba$).

Nevertheless, it should be observed that phase conjugation in photorefractive materials generally takes place on one polarization only of the light.

To solve this difficulty, various solutions can be envisaged.

One of them consists in placing a monomode spatial filter between the modules 11 and 12 and the loop 13, which filter may be implemented, for example, by a portion of monomode fiber, optionally with conservation of polarization, between the coupler 17 and the separator 18, optionally together with a polarizer 19 (FIG. 2).

At the output from the separator 18, light is coupled into the multimode fibers of the loop 13.

It then propagates round said loop 13 in numerous modes giving rise to a wide variety of polarizations on reaching the phase conjugate "mirror" 16. Those portions of the incident waves which are polarized along the active axis of the crystal will give rise to the double phase conjugation phenomena and return to the separator 18 using the same propagation modes and will therefore enter into the monomode waveguide of the separator.

The two portions polarized orthogonally to the active axis of the crystal will be diffracted randomly by the grating constituted by the other polarization and will return to the separator in modes that are unrelated to the go modes. Coupling with the monomode separator 18 will therefore be very weak and only a very small amount of the light will be able to penetrate therein.

An improvement to this solution consists in selecting a birefringent crystal for the double phase conjugate mirror which separates the polarizations spatially so as to eliminate the polarization which will not be conjugated and which will be diffracted. This amounts to putting a polarizer on each face of the crystal.

Another solution consists in making the phase conjugate "mirror" 16 out of a crystal that is capable of conjugating both polarizations, e.g. BSO.

In addition to its property of photorefractivity used for phase-conjugation purposes, BSO possesses optical activity. This property causes the polarization of light to rotate as it propagates through the crystal. Depending on the wavelength used, it is possible to cause the polarization to perform one complete revolution in a few millimeters. Thus, phase conjugation at each polarization is performed in different portions of the crystal perpendicularly to the mean propagation direction. A condition of operation is for the light entering the crystal through each of its sides to possess a plurality of polarizations so that interference necessarily takes place for each of the polarizations. This is achieved by ensuring that a very great variety of modes is in use for propagation along the fiber, with the variety of modes generating the variety of polarizations.

Naturally, solutions other than the two presented above are also possible.

In particular, it would also be possible to provide recombining rotating separator devices of the type described, for example in above-mentioned reference [3].

Also advantageously, the lengths of the two branches L1 and L2 of the loop 13 are selected to be substantially equal, thereby making it possible to minimize sensitivity of the gyro to the crystal continuously adapting to variations of the wave front.

It may be observed that seen from the middle of the coil of the loop 13, the Sagnac effect produces counter-propagating waves in the branches L1 and L2, with phase shifts that are equal and of opposite sign. Since the directions of propagation are opposite, the two waves remain in-phase (one moving forwards while the other is moving backwards), which is specifically the phenomenon that is generally looked-for by using the phase modulator means 14 which are usually implemented with equal amplitudes and phase opposition. Consequently, positioning the phase conjugate "mirror" 16 in the middle of the loop appears to be particularly advantageous.

Likewise, the Y junction 17 is selected to be accurately symmetrical so that the light powers reaching each side of the crystal are as similar as possible, thus ensuring optimum operation of the crystal.

It may be observed that if the "mirror" 16 is slightly offset from the middle position, then in addition to a small phase shift due to the lack of symmetry in the Sagnac effect, it will be subjected to offset peaks where the interference in phase opposition will tend to write another grating that is not desired. This offset remains acceptable so long as the ratio $2d/L$ remains small, where d is the offset of the "mirror" 16 relative to the middle of the loop 13, and L is the length of the fiber. For example, for a loop having a length of 1 km, an offset of 5 cm is entirely acceptable ($2d/L=10^{-4}$).

Also, it is preferable for the incident wave and for the pump wave not to have accurate time coherence, since that would give rise to parasitic effects in the crystal. Nevertheless, the interference must remain spatially coherent within the crystal, which means that the coherent length Lc of the source 11 must be longer that the thickness e travelled through the device 16.

To satisfy both conditions, it is necessary to satisfy the following inequalities:

$2d>Lc>e$ where the inequality $2d>Lc$ inducing the first condition of time incoherence by path asymmetry.

I claim:

1. A multimode optical fiber gyro, comprising:

emitting means for emitting a light beam;

a multimode optical fiber loop, having two branches with opposing ends, through which said light beam propagates in two directions before being recombined;

a double phase conjugate mirror, disposed approximately at a midpoint of said fiber loop and accepting said propagated light beam through two sides of said mirror thereof;

a recombining means for recombining said propagated light beam;

detecting means for detecting the phase of the recombined propagated light beam; and wherein said propagated light beam incident upon each side of said mirror serves as a pumping wave for phase conjugation of said propagated light beam incident upon the other side of said mirror.

2. A gyro according to claim 1, including a monomode filter between a junction of the two ends of said fiber loop and said emitting means.

3. A gyro according to claim 2, further including polarizer means between said junction of the two ends of said fiber loop and said emitting means.

4. A gyro according to claim 1, wherein said double phase conjugate mirror is a photorefractive crystal.

5. A gyro according to claim 3, wherein said double phase conjugate mirror is a birefringent photorefractive crystal.

6. A gyro according to claim 4, wherein said crystal is a BSO type capable of conjugating both polarizations.

7. A gyro according to claim 1, wherein the branches of said loop on either side of said double phase conjugate mirror are of approximately equal length.

8. A gyro according to claim 1, wherein a junction between the two ends of said fiber loop is symmetrical.

9. A gyro according to claim 8, wherein said emitting means has a coherent length Lc such that:

$2d>Lc>e$ where e is the thickness of said double phase conjugate mirror, and d is the offset of said mirror relative to the mid-point of said fiber loop.

10. A gyro according to claim 1, including means for phase-modulating said propagated light entering the loop.

11. A gyro according to claim 1, wherein the gyro is a Sagnac type gyro.

* * * * *

UNITED STATES PATENT AND TRADEMARK OFFICE
CERTIFICATE OF CORRECTION

PATENT NO. :5,898,497
DATED :April 27, 1999
INVENTOR(S) :Audren

It is certified that error appears in the above-identified patent and that said Letters Patent is hereby corrected as shown below:

On the title page, item [75] add Gerald Roosen and Philippe Delaye

Column 6, line 52, after "light" please insert --beam--

Signed and Sealed this

Twenty-fourth Day of October, 2000

Attest:

Q. TODD DICKINSON

*Attesting Officer*     *Director of Patents and Trademarks*